Dec. 5, 1950 W. W. CHUPP 2,532,891
FLANGED JOINT SEALING GASKET
Filed Sept. 23, 1948
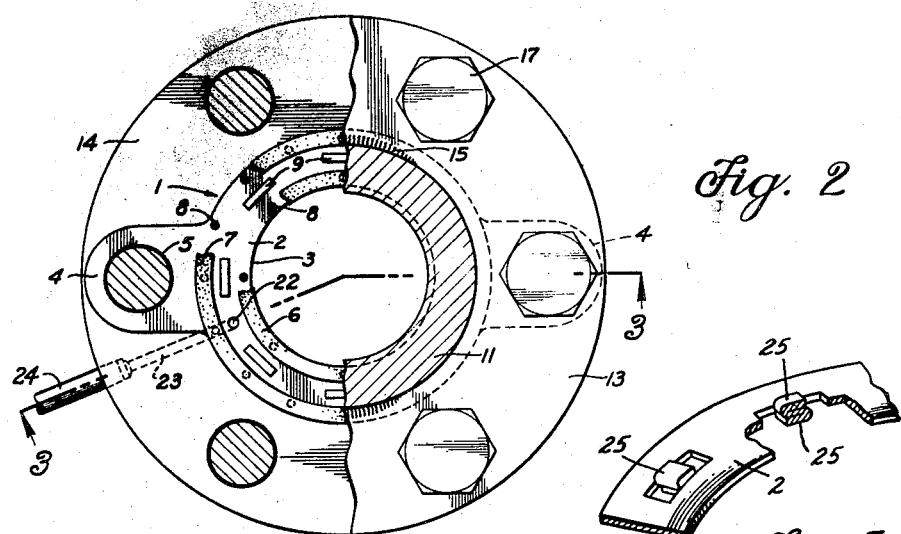
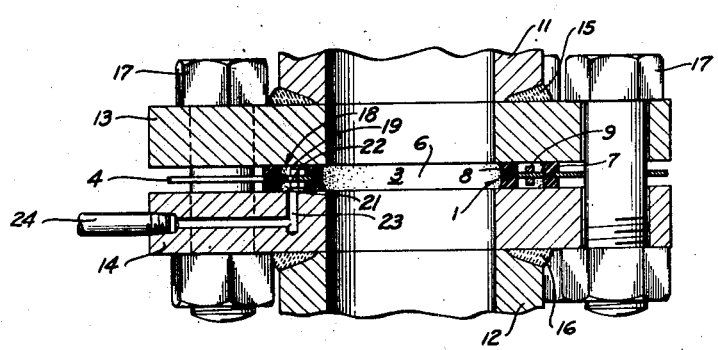
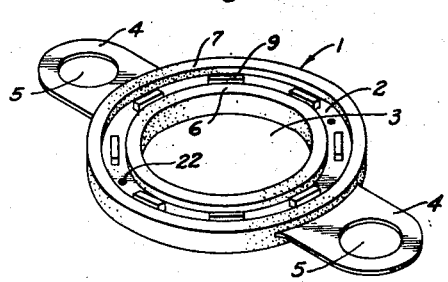
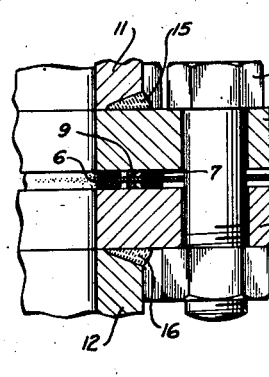
INVENTOR.
WARREN W. CHUPP
BY
*Roland A. Anderson*
ATTORNEY Patented Dec. 5, 1950

2,532,891

UNITED STATES PATENT OFFICE 2,532,891

FLANGED JOINT SEALING GASKET

Warren W. Chupp, Berkeley, Calif., assignor to the United States of America as represented by the United States Atomic Energy Commission Application September 23, 1948, Serial No. 50,721

5 Claims. (Cl. 285—130)

This invention relates to gaskets which are adapted to be used for sealing the connection between flanges or other plane surfaces in pressure vessels and conduits and more particularly to gaskets which are adapted to seal the connection between flanges or other plane surfaces in vacuum conduits or evacuated vessels.

In evacuated systems in which the component parts are connected by means of flanges or abutting plane surfaces, special problems are presented in the design of the sealing gaskets which are used to prevent leakage. In a system which is to be highly evacuated, it is imperative that even the smallest leaks be eliminated. In order to eliminate all leaks, it is desirable that each connection be arranged so that it may be tested individually to allow detection of leakage. Other desirable features in such a gasket seal are that the latter be so constructed that assembly of the connection is expedited, disassembly of the connection may be readily effected without destroying the gasket, and proper alignment of the flanges and proper tensioning of the sealing means be assured by some simple means incorporated into the design.

Accordingly, it is an object of this invention to provide a gasket for sealing the joint between flanges or abutting plane surface connections in vacuum systems.

Another object of this invention is to provide a gasket for sealing the joints between flanges or abutting plane surface connections in vacuum systems which is arranged and constructed to provide for the detection and elimination of leakage of the seal.

Another object of this invention is to provide a gasket for sealing flanges or abutting plane surface connections in vacuum systems which is arranged and constructed to limit the degree of the compression which may be applied to the sealing means.

A further object of this invention is to provide a gasket for sealing flanges or abutting plane surface connections in vacuum systems which is arranged and constructed to induce correct alignment of the parts of the joint.

Further objects and advantages will appear in the following description and accompanying drawings in which:

Figure 1 is a perspective view of the gasket constructed in accordance with the invention;

Fig. 2 is a plan view of the gasket shown installed in a flanged connection. Portions of the flange and of the gasket have been broken away to better illustrate construction details;

Fig. 3 is a cross section taken on the vertical plane 3—3 as indicated on Fig. 2. The flange bolts are shown as being only lightly tightened in order to illustrate the appearance of the gasket when in the uncompressed state;

Fig. 4 is a fragmentary view of the right-hand side of Fig. 3. In this view, the flange bolts have been fully tightened to illustrate the appearance of the gasket when in the fully compressed state;

Fig. 5 is a fragmentary view of the invention which has been modified to provide an easily constructed form thereof.

This novel gasket seal may be regarded as comprising, in general, a pair of rings formed of compliant material arranged concentrically and supported in spaced relation to each other. The concentric rings together with the plane surfaces of the flanges form an annularly shaped cavity which is utilized for the purpose more fully discussed below. In association with the aforementioned rings and supported in appropriate position thereto, there is provided one or more mechanical stop elements which are adapted to limit the deflection which the compliant rings may undergo during compression resulting from the tightening of the joint and which are further adapted to induce proper alignment of the surfaces which contact the compliant rings. In assembling joints in which the gasket seal is employed, it has been found that the incorporation of gauging tabs of appropriate design greatly facilitates assembly of the joint by providing assured alignment of the gasket seal with respect to the flanges or other types of abutting plane surface connections with which the sealing gasket is used. It will be appreciated that the sealing gasket may be utilized in the absence of the gauging tabs, and it will become more apparent as the description of the invention proceeds that the sealing gasket may be constructed in a variety of modified shapes and of a variety of materials without departing from the true spirit and scope of the invention.

Referring now to the preferred embodiment of the invention which is shown, per se, in Fig. 1, and in association with flanges to form a complete flanged joint assembly in Figs. 2-4, this novel flange sealing gasket is generally indicated at 1. Structurally, the gasket seal 1 may be seen to comprise an annular plate 2 which serves as a foundation and supporting element and which is formed with a central opening 3, has outwardly projecting and appropriately disposed integral gauging tabs 4, the latter being apertured at 5 to provide bolt aligning openings as will later be more fully described. Compliant rings 6 and 7 are attached respectively to the inner and outer marginal edges of plate 2 in such manner that each extends above and below the same plate 2 so as to provide the actual sealing means which is employed in this sealing gasket. The rings 6 and 7 may be seen to extend continuously about the marginal edges of plate 2 and may be seen to be attached to plate 2 by means of material of the rings which extends through the perforations 8 which are formed in plate 2. The rings may be formed of any compliant material such as vulcanizable compounds of synthetic or natural rubber which yield vulcanized products of suitable physical and chemical properties. For many applications compounds yielding vulcanized rings having a hardness of the range of 40 to 70 Shore A durometer will be found satisfactory. It will be appreciated that the rubber compounds of which the rings are formed should contain no material having a high vapor pressure when these gasket seals are to be employed in highly evacuated systems. Other considerations pertaining to the method of attachment, composition and disposition of rings 6 and 7 will be more fully discussed below.

Mechanical stop elements 9 are attached to the plate 2 in the area between rings 6 and 7. These stops 9 are arranged in directly aligned pairs with a member of the pair mounted on each of the opposing faces of plate 2. These stops 9 are generally of similar height and are designed to carry the excess force created by tensioning of joints in which the gasket seal 1 is utilized. The height of stops 9 is appropriately adjusted to allow sufficient deflection of rings 6 and 7 to effect adequate sealing of the joint. Stops 9 are constructed of equal height in order to induce proper alignment of the plane surfaces of the flanges or abutting plane surface connections with which the seal 1 is utilized. The operation of stops 9 will become more apparent as the invention is further described.

Sealing gasket 1 will now be described with reference to a typical installation for the purpose of more fully explaining the various features of the invention. Referring, therefore, to Fig. 3, there is illustrated a typical flanged pipe connection with the sealing gasket 1 mounted therein. In Fig. 3, there is shown aligned pipe sections 11 and 12, joined to companion flanges 13 and 14, by welded joints 15 and 16 respectively. Each of the flanges 13 and 14 includes a plurality of bolt holes to receive bolts 17, which bolts 17 engage the apertures 5 in the gauging tabs 4, in such manner as to properly align the sealing gasket 1. It will of course be appreciated that the position of the bolts with respect to the proper operating position of sealing gasket 1 is the factor which controls the position and dimensions of the gauging tabs 4. Accordingly, when the bolts 17 are even in number and evenly spaced in location, two tabs 4 oppositely disposed constitute a convenient arrangement. If the bolts 17 are odd in number and evenly spaced, then some other appropriate arrangement of the tabs 4 may be used.

Referring again to Fig. 3, wherein sealing gasket 1 is illustrated in an unstressed condition, there will now be described the series of events which transpire as the joint is tightened in a typical assembly operation. As the bolts 17 are tightened, flanges 13 and 14 move inwardly, thereby compressing the compliant rings 6 and 7 until the faces of flanges 13 and 14 contact the stops 9 whereupon further movement of flanges 13 and 14 is restrained, thus resulting in the condition illustrated in Fig. 4. Examination of Fig. 4 will reveal that the compliant rings 6 and 7 have been deformed, and it is apparent that a compliant material utilized in such a manner must promote an efficient sealing action. It can be seen from Fig. 4 that the cooperation of the mechanical stops 9 has prevented destructive compression of the rings 6 and 7. Further, it will be noted and appreciated that the stops 9 constructed and arranged as shown must induce the proper alignment of the flanges 13 and 14 when the bolts 17 are tightened to bring about the condition shown in Fig. 4. In the operations just previously described, there are accomplished the intended objects of providing means for limiting the degree of compression which may be applied to the sealing gasket and means for inducing proper alignment of the parts of the joint.

The method of leak detection will now be described in conjunction with the means incorporated into the sealing gasket 1 which is intended to expedite the testing function. With reference to Fig. 3, it will be noted that therein is illustrated a passageway 18 comprising cavities 19, 21, and the connecting aperture 22. This passageway 18 is arranged so that, on proper assembly of the joint, it connects with the duct 23 formed in the flange 14, which duct 23 is attached to external devices by means of connector 24. Leakage of the gases past the seal formed by the sealing rings 6 and 7 may be detected by attaching a Philips ion gauge or other similar device to the connector 24 and exhausting the passageway 18 in such a manner that the gas contained therein is exhausted through the aforementioned device. Now the leakage may be detected by releasing helium or other gas, which is detectable by means of the mentioned device, in the vicinity of the joint, whereupon leakage is evidenced by the appearance of the released gas in the gas being evacuated from passageway 18. Appropriate action may then be instituted to eliminate the leakage. Furthermore, passageway 18 may be employed to assure or minimize the effect of leakage by connecting the mentioned passageway 18 to an auxiliary evacuating system, thereby evacuating the passageway 18 and reducing the pressure gradient which exists across ring 6. In the manner described, there is accomplished the object of providing means for detecting and eliminating leakage in the sealing gasket 1.

Various possible alternative arrangements and constructions will now be considered. In the described embodiment the mechanical stops 9 have been placed in the area between the sealing rings 6 and 7 and this position has been found most advantageous from the standpoint of compactness and convenient operation; however, it is possible to position the stops 9 external to either ring by extending the plate 2 beyond either ring 6 or 7 to yield other useful modifications of the invention. Furthermore, a variety of constructions is possible in providing the stops 9; instead of using blocks of metal spot welded to the plate 2, as are used in the example shown, it is possible by utilizing punch press methods to perforate the plate 2 as shown in Fig. 5 so that sections 25 are partially detached and folded back upon themselves to give suitable stop constructions. The stops 9 are shown as a series of blocks arranged concentrically with the sealing rings 6 and 7; however, it is possible to substitute a ring of rigid material having perforations to allow free passage of gas therethrough. Other conceivable methods of producing satisfactory stops involve the production of corrugations or folds in the element which supports the sealing rings. Although a variety of constructions is possible, it is yet required that the dimensions be selected to preserve the objects intended.

In common with the equivalent modifications possible in the construction of the stops, several modifications as regards composition, disposition, and attachment are possible with regard to the sealing rings 6 and 7. The rings 6 and 7 are shown as being attached by means of material from the rings which extends through the perforations 8. A perfectly acceptable alternative method is to attach the rings 6 and 7 to the plate 2 by means of bonding agents. Another very suitable method is to employ both of the mentioned methods simultaneously. Channels formed in the plate 2 may also be used to seat and retain the rings 6 and 7. In the example shown, the rings 6 and 7 have been so employed that the material of the rings 6 and 7 is extended to cover the marginal edges of the plate 2. This arrangement may be altered to allow the marginal edge of plate 2 to project beyond the sealing rings 6 or 7. Although the embodiment shown has proven satisfactory in many applications, it is possible that, as the occasion arises, modifications of the invention embodying some of the alternative constructions described above may prove of considerable value.

Use of the novel sealing gasket herein disclosed has greatly facilitated installation and maintenance of large scale vacuum systems. Considerable economies have resulted from the use of this efficient sealing gasket, as a result of the facilitation of leak detection, elimination of damage caused by misalignment of the joints and the elimination of damage resulting from overcompression of the sealing gaskets previously employed. It is clearly apparent from the foregoing that the present invention provides a highly useful gasket for sealing flanges or abutting plane surface connections in vacuum systems.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A gasket seal comprising a first and a second ring of rubber-like material radially spaced to form an annular cavity therebetween, a centrally apertured member disposed in said annular cavity for supporting said rings in relatively fixed relation, and a mechanical stop element carried by said member, said stop having a height less than the undeformed height of said rings and greater than the height at which said rings fail during deformation.

2. A gasket seal for a flanged joint comprising a flat, reatively rigid member having a central opening formed therein defined by an inner marginal edge inwardly spaced from the outer marginal edge of said member, a first ring of compliant material affixed to the inner marginal edge of said member adjacent to said opening, a second ring of compliant material affixed to the outer marginal edge of said member, and a plurality of rigid stops attached to said member, arranged in the space between said first and second rings and of a uniform height less than the height of said rings and greater than the height at which said rings fail mechanically during deformation.

3. A gasket seal for sealing the joint between flanges used to connect the components of a vacuum system comprising an annular flat supporting member having a relatively large central opening formed therein defined by an inner marginal edge inwardly spaced from the outer marginal edge of said member, a first ring of rubber-like material attached to the inner marginal edge of said member adjacent to said central opening and extending to either side of said member, a second ring of rubber-like material attached to the outer marginal edge of said member and projecting to either side of said member, a plurality of rigid stops attached to said plate in the area between said rings and of a uniform height less than the undeformed height of said rings and greater than the height at which said rings fail mechanically during deformation, and outwardly projecting tabs integral with said supporting member, said tabs being suitably apertured for the reception of flange bolts extending therethrough so as to provide positive alignment of the gasket seal.

4. In combination a pair of flanged members having superposed parallel plane surface portions provided with a central aperture constituting a vacuum conduit and a plurality of marginal apertures for the reception of flange bolts therein, and one of said flanged members being also provided with a passageway leading from a part on its plane surface portion between said central and said marginal apertures exteriorly of said flange, and a gasket seal assembly disposed between said surface portions and comprising a flat relatively rigid member having a central aperture and a pair of marginal apertures in alignment with the apertures of said flanged members and at least one aperture through said member at the approximate radius of said part, a first ring of rubber-like material carried by said rigid member and disposed radially between said central aperture and said part, a second ring of rubber-like material disposed radially between said marginal apertures and said part, and a stop means of uniform thickness which is less than the undeformed thickness of said rings and which are carried by said relatively rigid member, whereby the planar faces of said flanged members are brought into positive alignment and whereby said rings may not be deformed in excess of the rupture point of the rubber-like material.

5. The gasket seal as defined in claim 3 wherein said rigid stops are formed by partially detaching portions of said rigid member by cutting and subsequently folding said detached portions back upon said member to produce a multiple thickness of said member.

WARREN W. CHUPP.

REFERENCES CITED

The following references are of record in the file of this patent:

UNITED STATES PATENTS

| Number | Name | Date |
|--------|------|------|
| 323,731 | Phillips | Aug. 4, 1885 |
| 1,910,706 | Malzard | May 23, 1933 |